(12) United States Patent
Choate

(10) Patent No.: US 10,351,385 B2
(45) Date of Patent: Jul. 16, 2019

(54) REDUCED SIZED WEARABLE RETRACTABLE

(71) Applicant: Reliance Industries, LLC, Wheat Ridge, CO (US)

(72) Inventor: Gary E. Choate, Lakewood, CO (US)

(73) Assignee: Reliance Industries, LLC, Wheat Ridge, CO (US)

( * ) Notice: Subject to any disclaimer, the term of this patent is extended or adjusted under 35 U.S.C. 154(b) by 180 days.

(21) Appl. No.: 15/492,767

(22) Filed: Apr. 20, 2017

(65) Prior Publication Data

US 2018/0305170 A1 Oct. 25, 2018

(51) Int. Cl.
*A62B 35/00* (2006.01)
*B65H 75/44* (2006.01)

(52) U.S. Cl.
CPC ..... *B65H 75/4428* (2013.01); *A62B 35/0093* (2013.01)

(58) Field of Classification Search
CPC .. B65H 59/38; B65H 59/382; A62B 35/0093; A62B 35/04; A62B 35/00; A62B 35/0068; F16D 15/00; F16D 59/00; E04G 21/3204
See application file for complete search history.

(56) References Cited

U.S. PATENT DOCUMENTS

| | | | | |
|---|---|---|---|---|
| 3,442,466 A * | 5/1969 | Fritsche | ............... | B60R 22/3413 242/379.1 |
| 3,590,656 A * | 7/1971 | Lloyd, Jr. | .......... | B65H 75/4434 188/82.7 |
| 3,760,910 A * | 9/1973 | Koshihara | .......... | A62B 35/0093 182/237 |
| 4,511,123 A | 4/1985 | Ostrobrod | | |
| 4,877,110 A | 10/1989 | Wolner | | |
| 6,279,682 B1 * | 8/2001 | Feathers | ............ | A62B 35/0093 182/239 |
| 7,210,645 B2 | 5/2007 | Paterson et al. | | |
| 9,670,980 B2 * | 6/2017 | Jones | ...................... | A62B 35/04 |
| 2006/0054730 A1 * | 3/2006 | Paterson | ............ | A62B 35/0093 242/382 |
| 2009/0211849 A1 * | 8/2009 | Smith | ................. | A62B 35/0037 182/231 |
| 2011/0278095 A1 | 11/2011 | Hetrich et al. | | |
| 2012/0031701 A1 * | 2/2012 | Jones | .................. | A62B 35/0093 182/5 |

(Continued)

*Primary Examiner* — Daniel P Cahn

(74) *Attorney, Agent, or Firm* — Sandberg Phoenix & von Gontard PC

(57) ABSTRACT

A pawl-less retractable comprises an inner frame with a drum-sperrad assembly mounted to the inner frame between side members of the frame to rotate relative to the frame. The inner frame is pivotally mounted to a stop cap above the drum-sperrad assembly such that the frame, and hence the drum-sperrad assembly, can pivot relative to the stop cap. The stop cap comprises a central body, a leading wing extending from a first side of the central body and a trailing wing extending from a second side of the central body opposite said first side. In use, the inner frame and drum-sperrad assembly can pivot relative to the stop cap or alternatively an outer frame, between an unlocked position in which the teeth of the sperrad are inside of an engagement zone circle and a locked position in which the teeth are outside of the engagement zone circle.

12 Claims, 11 Drawing Sheets

(56) References Cited

U.S. PATENT DOCUMENTS

2012/0118670 A1* 5/2012 Olson ............... A62B 1/10
                                                                               182/232
2016/0346572 A1* 12/2016 Choate ............... A62B 35/0093
2018/0161608 A1* 6/2018 Choate ............... A62B 35/0093

\* cited by examiner

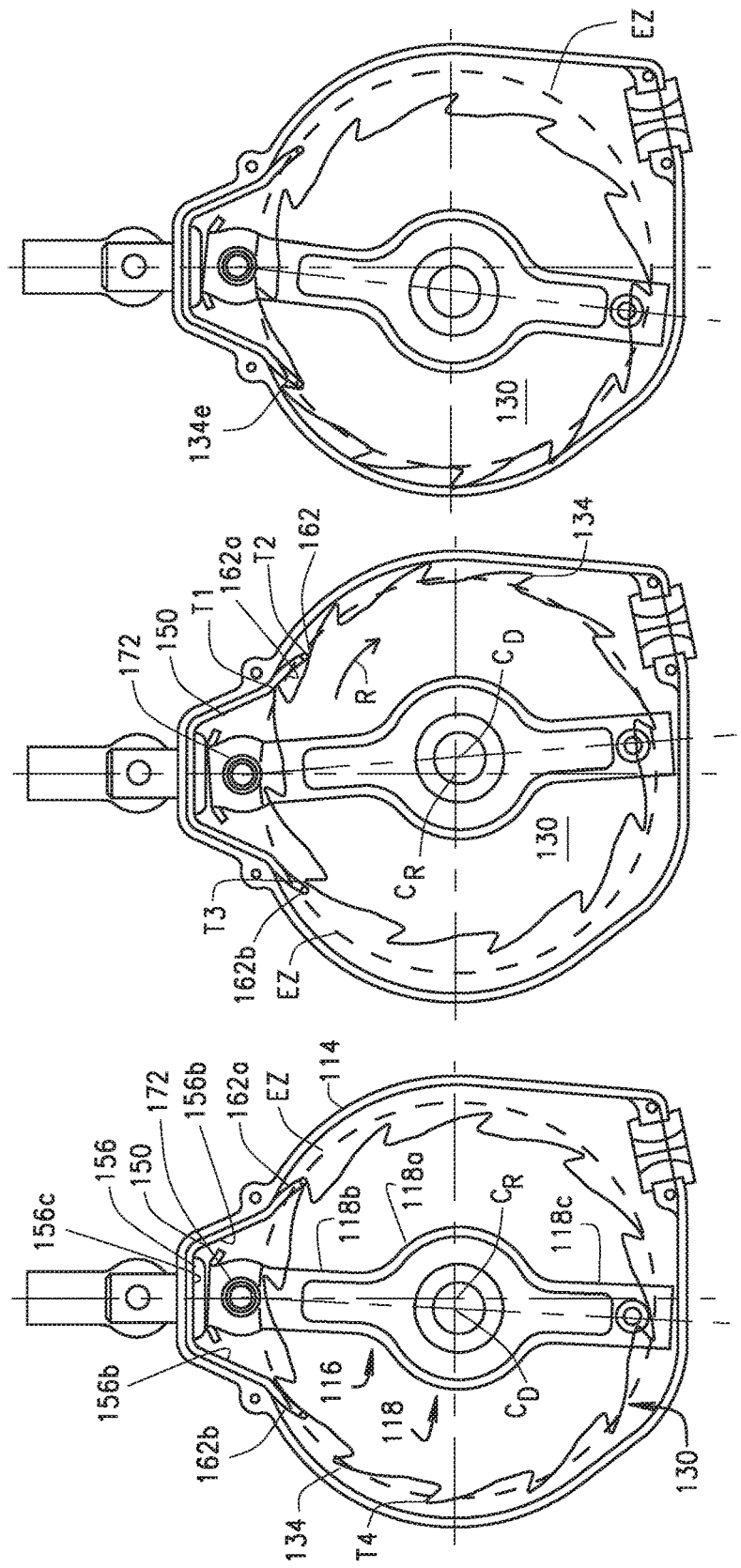

REDUCED SIZED WEARABLE RETRACTABLE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

This application relates to retractables, and in particular, to reduced-size wearable retractables, i.e., retractables having a diameter of less than about 3.5".

Apart from reliability, modern design for wearable retractables is governed by two primary concerns or factors: reduced cost and reduced weight. This creates pressure for designers to micro-miniaturize their designs. A limiting factor in miniaturizing retractables is that the locking mechanism (the pawls in particular) must also be miniaturized to fit in increasingly smaller housings. The minimum required strength of the pawls limits the size reduction of the retractable due to the fall arrest forces that these locking mechanisms must endure.

It would be beneficial to provide a wearable retractable that overcame this limitation of size reduction.

BRIEF SUMMARY

The retractable disclosed herein overcomes the above noted problem by eliminating the traditional pawl entirely. This is accomplished by providing sperrad teeth on clutch mounted sperrad plates outside the drum periphery (i.e., proximate or adjacent the drum walls) and allowing the drum to rock back and forth in the housing to duplicate the function of a traditional pawl. In essence, the function of the traditional pawl is replaced with a rocking drum/sperrad which engages a stop member or stop cap mounted in the housing of the retractable.

Illustratively, the retractable comprises an inner frame with a drum assembly and at least one sperrad mounted between side members of the frame to rotate relative to the frame. The sperrad and drum assembly are rotationally fixed relative to each other by use of a spring loaded clutch mechanism. The sperrad comprises a sperrad body with a plurality of teeth extending from a periphery of the pivotal sperrad body to the tip of the sperrad teeth.

The inner frame supporting the drum-sperrad is pivotally mounted to a stop member, in the form of a stop cap, such that the stop member and frame, and hence the drum, can pivot relative to each other. The stop cap comprises a central body, a leading wing extending from a first side of the central body and a trailing wing extending from a second side of the central body opposite said first side. A circle, the center of which corresponds to the true center of the drum (and is thus concentric with the drum), is sized such that the edges of the leading wing and trailing wing are at the perimeter of the circle when the drum center is centered relative to the housing. This circle defines the inner diameter of an engagement zone. The stop cap is fixed to the wearer's harness or an anchorage by a swiveling yoke at the top of the retractable. Thus, in use, the inner frame, and hence the drum-sperrad sub-assembly, pivots back and forth relative to the stop cap and the engagement zone between an unlocked position and a locked position. In the unlocked position, the sperrad is in a position relative to the engagement zone circle such that the tips of the teeth of the sperrad leading into the trailing wing are within the engagement zone circle (i.e., the sperrad does not cross over the engagement zone circle and thus have not entered the engagement zone). In the locked position, the sperrad is in a position relative to the engagement zone circle, such that the tips of the teeth of the sperrad leading into the trailing wing are beyond the engagement zone circle such that the edge of the trailing wing of the stop cap is received in a space between the sperrad teeth. In the locked position, the leading wing of the stop cap provides a cam surface which pushes against the tip of the sperrad teeth, causing the sperrad teeth to be moved beyond the engagement zone circle to enter the engagement zone.

BRIEF DESCRIPTION OF THE DRAWINGS

FIG. 12 is a side elevational view of the retractable (with a housing portion removed) showing the sperrad/drum sub-assembly pivoted to a maximum position due to the engagement of the sperrad teeth with the leading surface of the stop cap;

FIG. 13 is a view similar to FIG. 12, but in which the sperrad/drum sub-assembly is in a by-pass (or unlocked) position in which the sperrad teeth will not engage the stop cap;

FIG. 14 is a view similar to FIG. 12, but in which the drum/sperrad sub-assembly is pivoted fully to the left (with reference to the figure) to be in a fully locked position in which the cap edge engages a pocket of the sperrad.

Corresponding reference numerals will be used throughout the several figures of the drawings.

DETAILED DESCRIPTION

Figure 1:
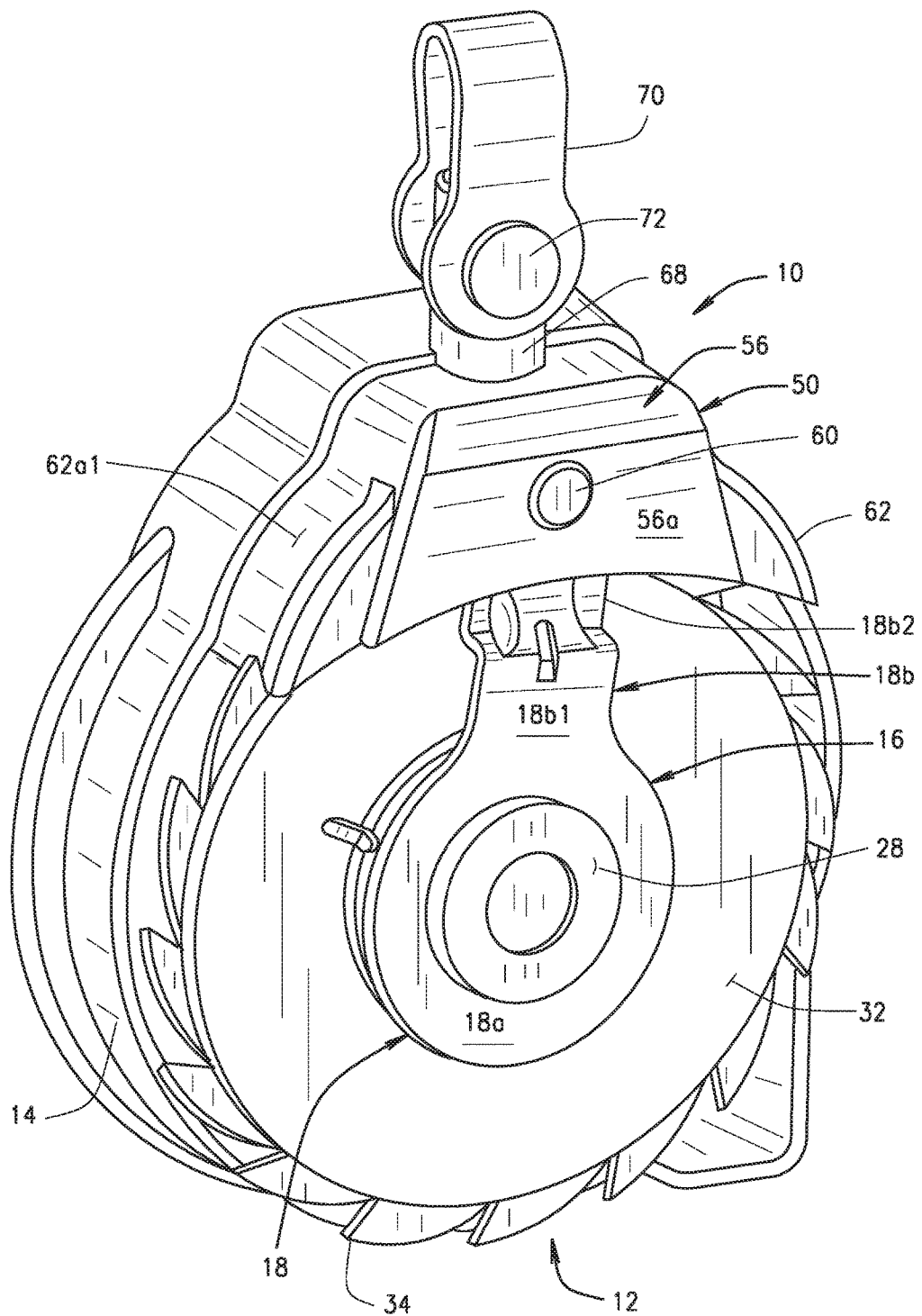
FIG. 1 is a perspective view of a retractable shown in a locked position with a portion of the housing removed.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

A retractable 10 comprises a retractable assembly 12 contained in a housing which is made from two mating housing shells 14. The retractable assembly 12 comprises an inner frame 16 comprised of opposed side members 18 which extend downwardly from opposite ends of a top member 20. The side members 18 each comprise a lower plate 18a which is shown to be generally circular and a neck 18b extending upwardly from the top of the plate 18a to the edge of the top member 20. Aligned openings 22 are formed in the plates 18a. The neck 18b includes a first portion 18b1 which extends upwardly from the plate 18a, and a second portion 18b2 which extends upwardly from the first portion 18b1, but is stepped inwardly at 18b3 relative to portion 18b1. An inner portion of the neck 18b defines a horizontal step (which is generally parallel to an axis A (FIG. 4) of the retractable) and an angled portion. The top portion 20 includes sunken middle portion 20a.

Figure 2:
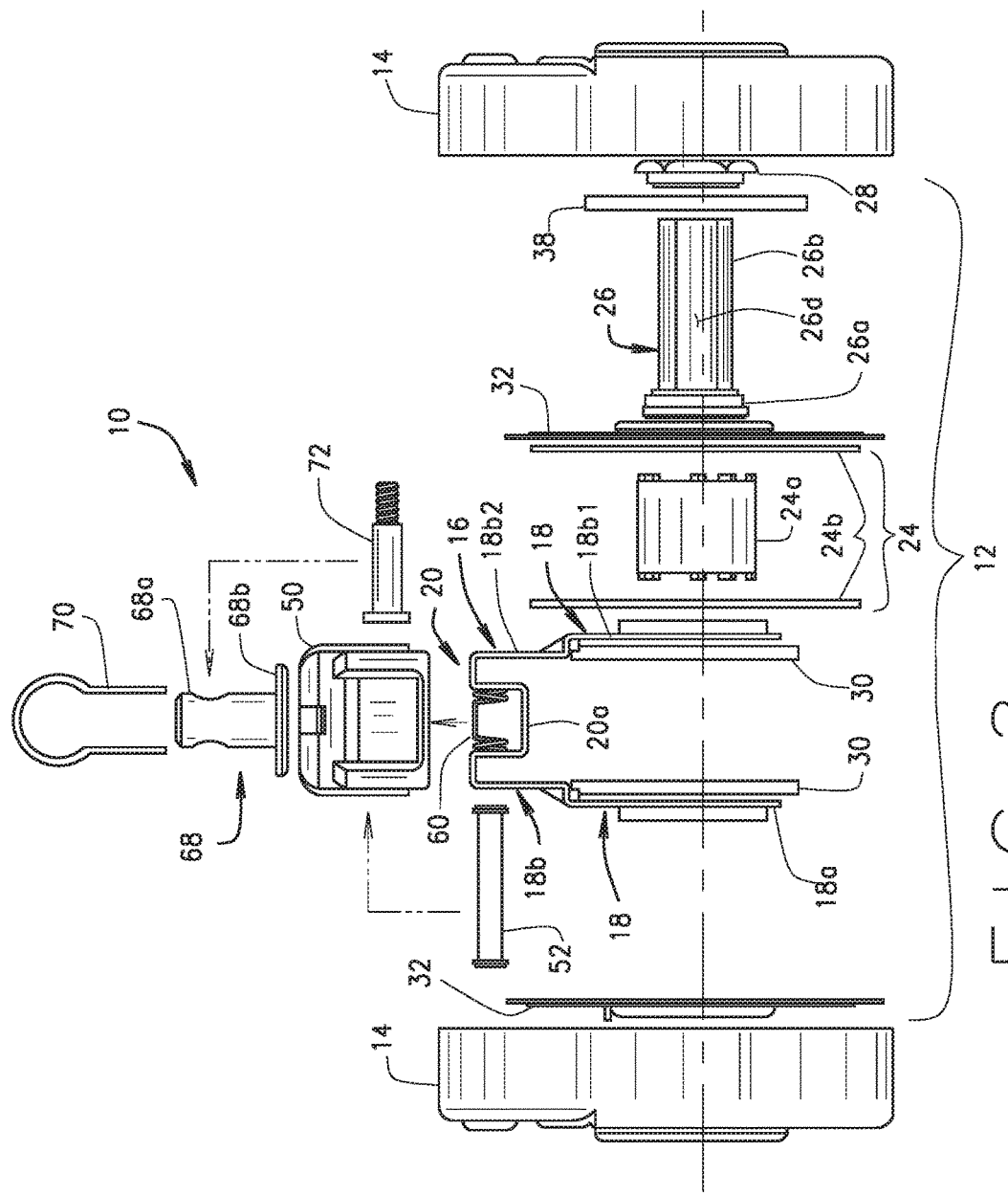
FIG. 2 is an exploded view of the retractable.
Figure 4:
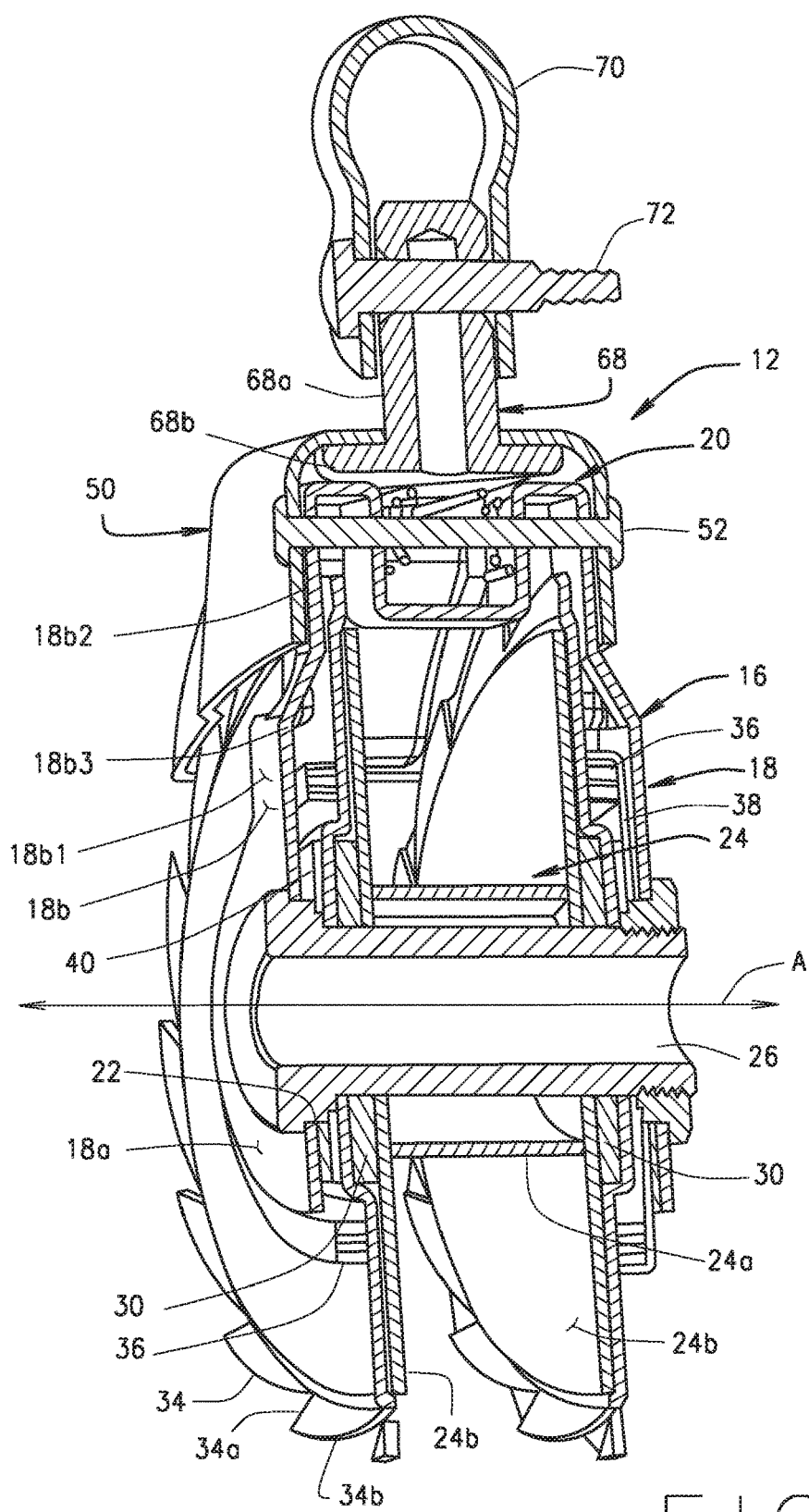
FIGS. 4 and 5 are perspective and side elevational cross-sectional views, respectively, of the retractable taken along line 4-4 of FIG. 3.
Figure 5:
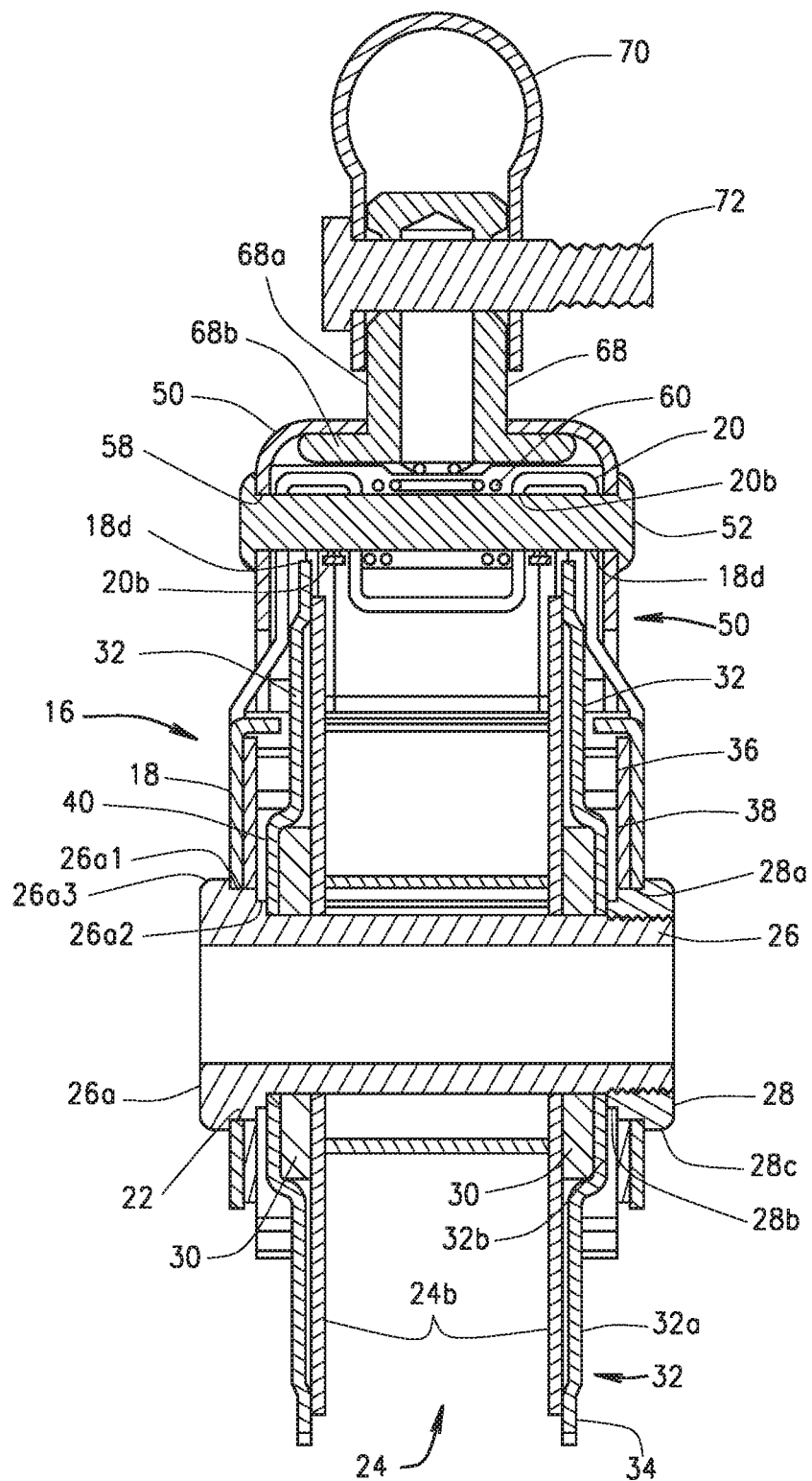

A drum assembly 24 is mounted between the inner frame's side members 18 on an axle 26. The drum assembly 24 comprises a cylindrical drum core 24a and opposed drum walls 24b. As seen in FIGS. 4 and 5, the axle 26 has a first enlarged end 26a, that is stepped down as at 26a1 and 26a2. The first step 26a1 is sized to be received in the opening 22 of the inner frame side member 18, and such that the outer portion 26a3 of the axle end 26a has a diameter greater than the diameter of the inner frame side member opening 22. The first step 26a1 forms a bearing surface around which the drum assembly 24 rotates. An axle body 26b extends from the inner surface of the axle end member 26a a distance greater than the width of the inner frame 16, so as to extend beyond the opposite inner frame side member 18. The end 26c of the axle body 26b opposite the end member 26a is threaded to receive a hex nut 28. Like the axle end portion 26b, the hex nut 28 is stepped as at 28a and 28b. The first step 28a is sized to be received in the opening 22 of the inner frame side member 18, and with the outer portion 28c of the hex nut having a diameter greater than the diameter of the inner frame side member opening 22. The first step 28a forms a second bearing surface around which the drum assembly 24 rotates. The hex nut is threaded onto the axle body 26b to secure the axle 26 to the inner frame, as will be described below. As can be appreciated, the first steps 26a1 and 28a of the axle enlarged end 26 and the nut 28, respectively, have substantially the same diameters. The longitudinal center of the axle body thus defines the axis A about which the axle rotates relative to the frame 16. As seen in FIG. 2, axle body 26b and the axle end member 26a both have at least one flat surface 26d, with the planes defined by the flat surfaces of the axle body and the axle end member being parallel to each other. Preferably, the axle body has two flat surfaces, giving the axle body 26b a cross-section, as seen in FIGS. 6-9, of a circle flattened on opposite sides.

Friction discs 30 are positioned about the axle body 26b adjacent the outer surfaces of the drum walls 24b. The friction discs 30 are radially centered or generally coaxial with the frame opening 22 and the axle 26.

Sperrads 32 are mounted to the axle adjacent the friction discs 30. The sperrads are keyed to the axle to rotate with the axle, and thus with the drum. The sperrads have a central opening through which the axle body passes. Preferably, this opening corresponds in size and shape to the cross-sectional size and shape of the axle body to thereby fix the sperrads, in rotation but not in translation, relative to the cross-section of the axle. Illustratively, this central opening has flat edges (giving the opening a flattened circle or double "D" shape, i.e., ⌬) corresponding to the flat surfaces 26d of the axle body 26b. This, in effect, keys the axle in such a way that the sperrads are rotationally fixed relative to the axle so that the axle and sperrads rotate in unison. The sperrads can be keyed to the axle in any other desired manner.

Figure 6:
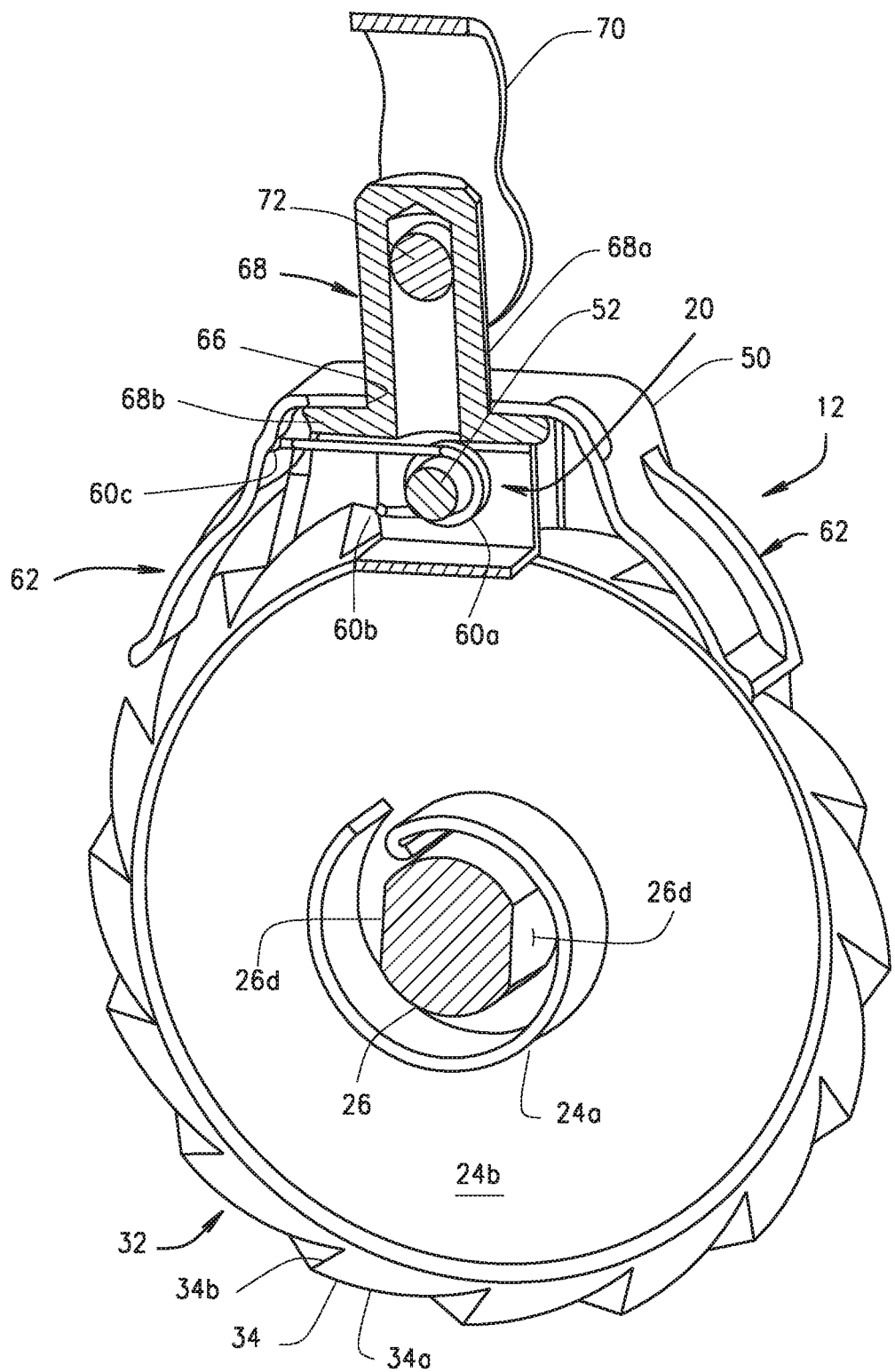
FIG. 6 is a transverse cross-sectional view of the retractable taken along line 6-6 of FIG. 3.

As seen, the sperrads 32 each have a main body 32a and a central portion 32b. The main body 32a has a diameter approximately equal to the diameter of the drum wall 24b. As seen, the main body 32a of the sperrad is adjacent an outer surface of the drum wall 24b, separated only by a friction disc. The sperrad central portion 32b protrudes outwardly from the sperrad main portion 32a to define a chamber sized to receive the friction disc 30. Thus, the friction disc 30 will be sandwiched between the sperrad and the drum wall. The sperrads also include sperrad teeth 34 around the outer periphery of the main body 32a. As seen in FIGS. 4 and 5, the teeth 34 are set inwardly slightly relative to the main body 32a of the sperrad 32. The inner surfaces of the teeth 34 are thus generally aligned with (or even slightly inside of the plane defined by) the drum walls 24b. With reference to FIG. 6, each tooth 34 comprises a trailing edge 34a which is generally arced and a leading edge 34b which extends from the end of the trailing edge 34a radially inwardly toward the perimeter of the sperrad main body 32a from a tip 34c of the tooth. As seen, the leading edge of each tooth also extends rearwardly, such that the junction between the leading edge 34b of the tooth and the sperrad main body 32a is radially inside of the trailing edge 34a defining an area 34d under or between each tooth 34. Additionally, the trailing edge 34a of each tooth extends from the base or inner end of the leading edge 34b of an adjacent tooth. The teeth are evenly spaced about the sperrad 32. The sperrad 32 illustratively shown in FIGS. 7-9 has sixteen teeth 34. The sperrads 32 could be made with more or fewer teeth, as may be desired. As is known, the number of sperrad teeth affects the lock-up speed (i.e., how quickly the retractable stops rotating in a fall situation). Thus, the number of sperrad teeth can be altered to achieve a desired lock-up speed. However, each sperrad 32 of the retractable has the same number of teeth, and in fact, are identical mirror images of each other, and are keyed to work together.

A spiral power spring 36 is received against the outer surface of each sperrad 32 and is enclosed by a spring housing 38. The spring housing is omitted on the left side of FIG. 5 for purposes of illustration. Depending on the capacity of the retractable, the retractable can contain just one power spring 36 or it can contain two power springs 36.

A Belleville washer 40 is mounted about the axle 26 concentrically with the spring 36. As seen in FIG. 5, one Belleville washer 40 is received on the step 26a2 of the axle end 26a to be sandwiched between the axle end 26b and the outer surface of the sperrad 32, and the other Belleville washer 40 is received on the step 28b of the hex nut to be sandwiched between the hex nut and the outer surface of the other sperrad 32. The unit may contain one or two Belleville washers. Alternatively stacks of multiple washers can be used, if the capacity of the retractable requires additional washers. As can be appreciated, when the drum assembly 24, friction discs 30, sperrads 32, and springs 36 are mounted to the axle 26 in the inner frame 16, the retractable members are sandwiched between the axle end 26a and the hex nut 28.

The Belleville washers 40 ensure a friction fit, such that the drum will be frictionally fixed rotationally relative to the sperrad by means of the friction discs, such that the drum assembly and sperrads will rotate together and in unison.

A lanyard, cable, webbing, etc. (not shown) is secured to the drum and wrapped about the drum. The cable has a free end to which, for example, a connector is mounted to connect the lanyard to the wearer's harness (or to an anchor if the retractable housing is connected to the wearer's harness). As the drum rotates, the cable is unwound from, or rewound onto, the drum, depending on the direction of rotation of the drum.

Figure 7:
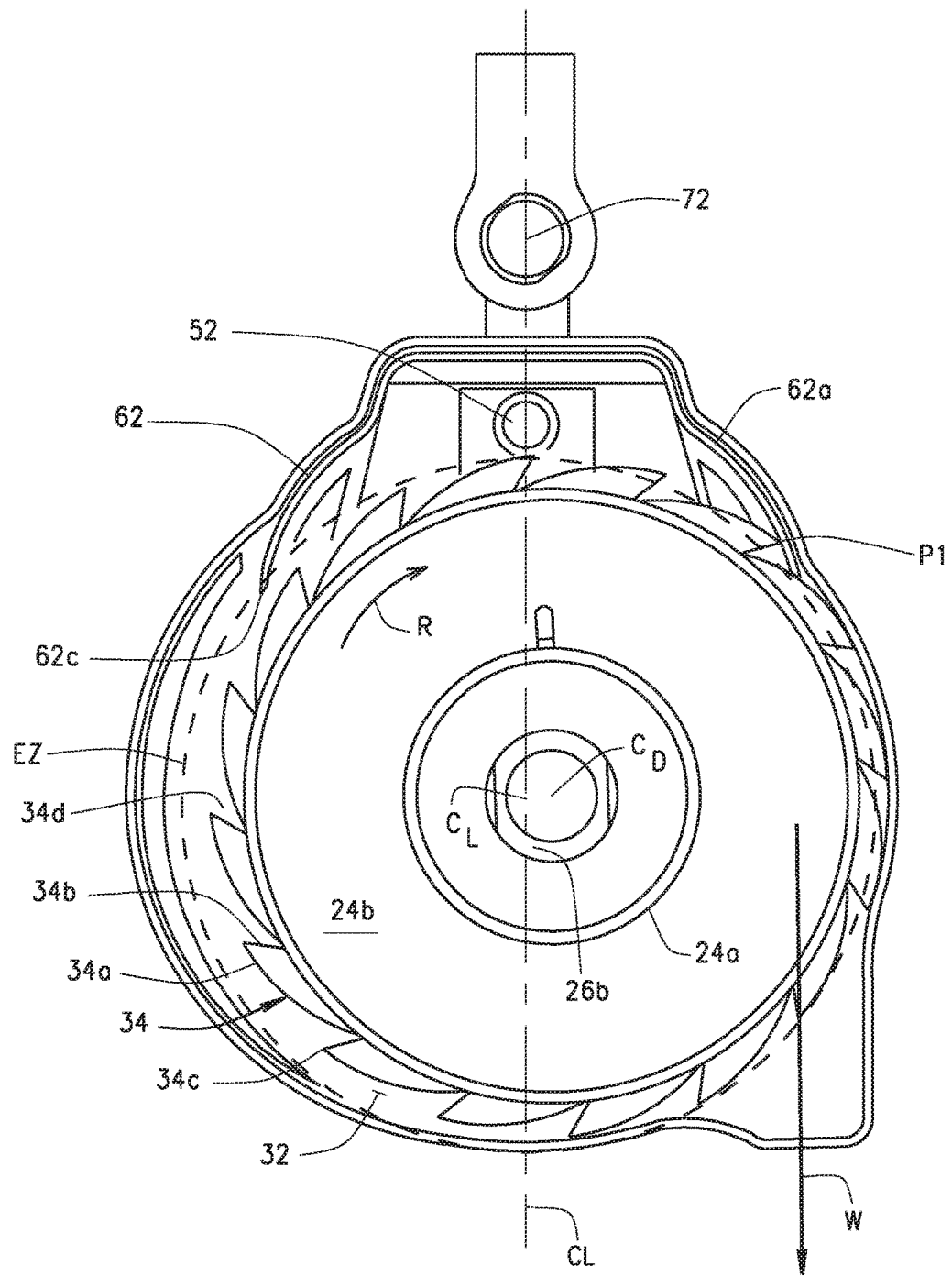
FIGS. 7-9 are cross-sectional views of the retractable, showing the retractable in an unlocked position (FIGS. 7 and 8) in which the retractable drum can rotate and a locked position (FIG. 9) in which the retractable drum is prevented from rotating.
Figure 8:
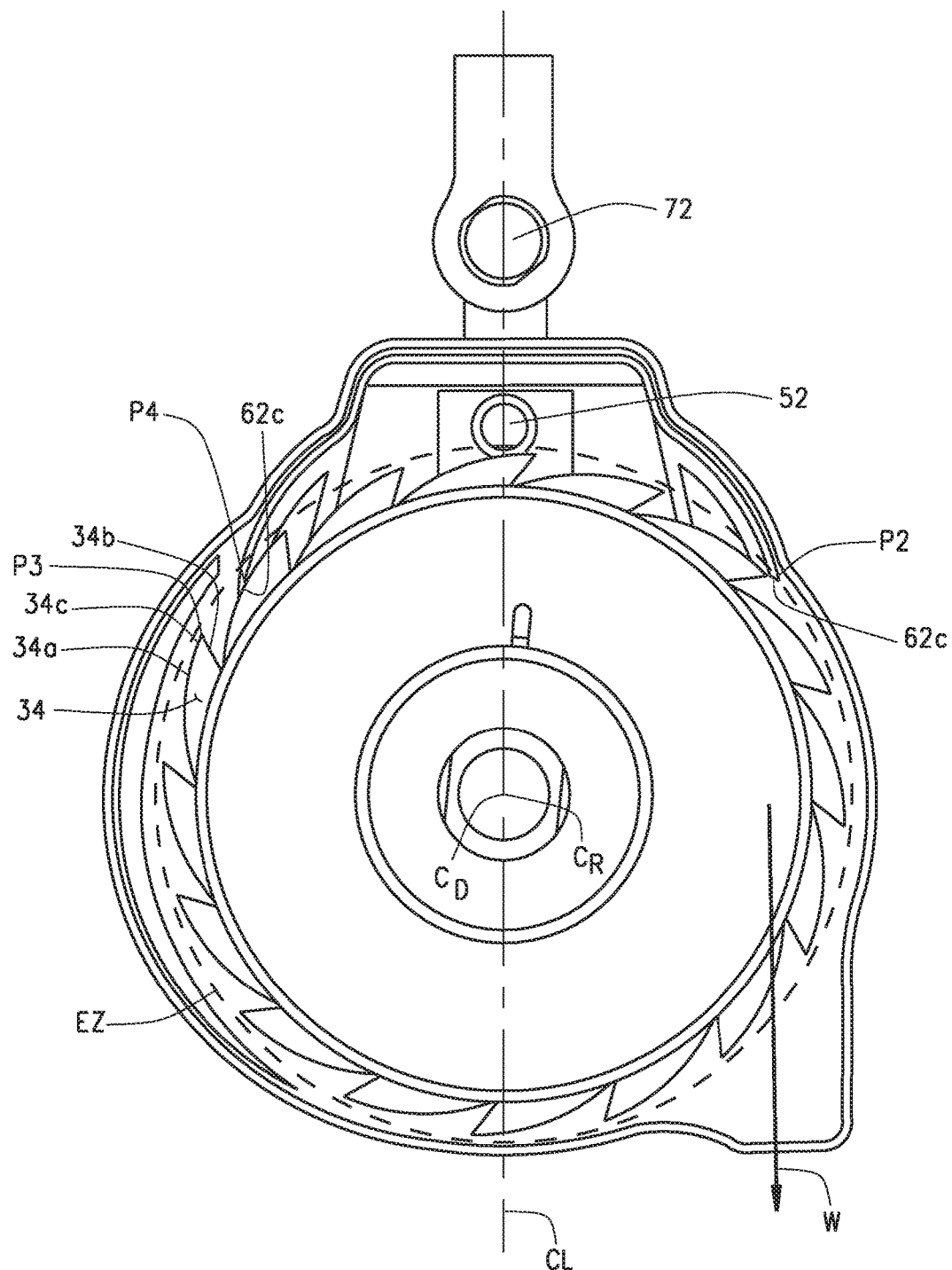
Figure 9:
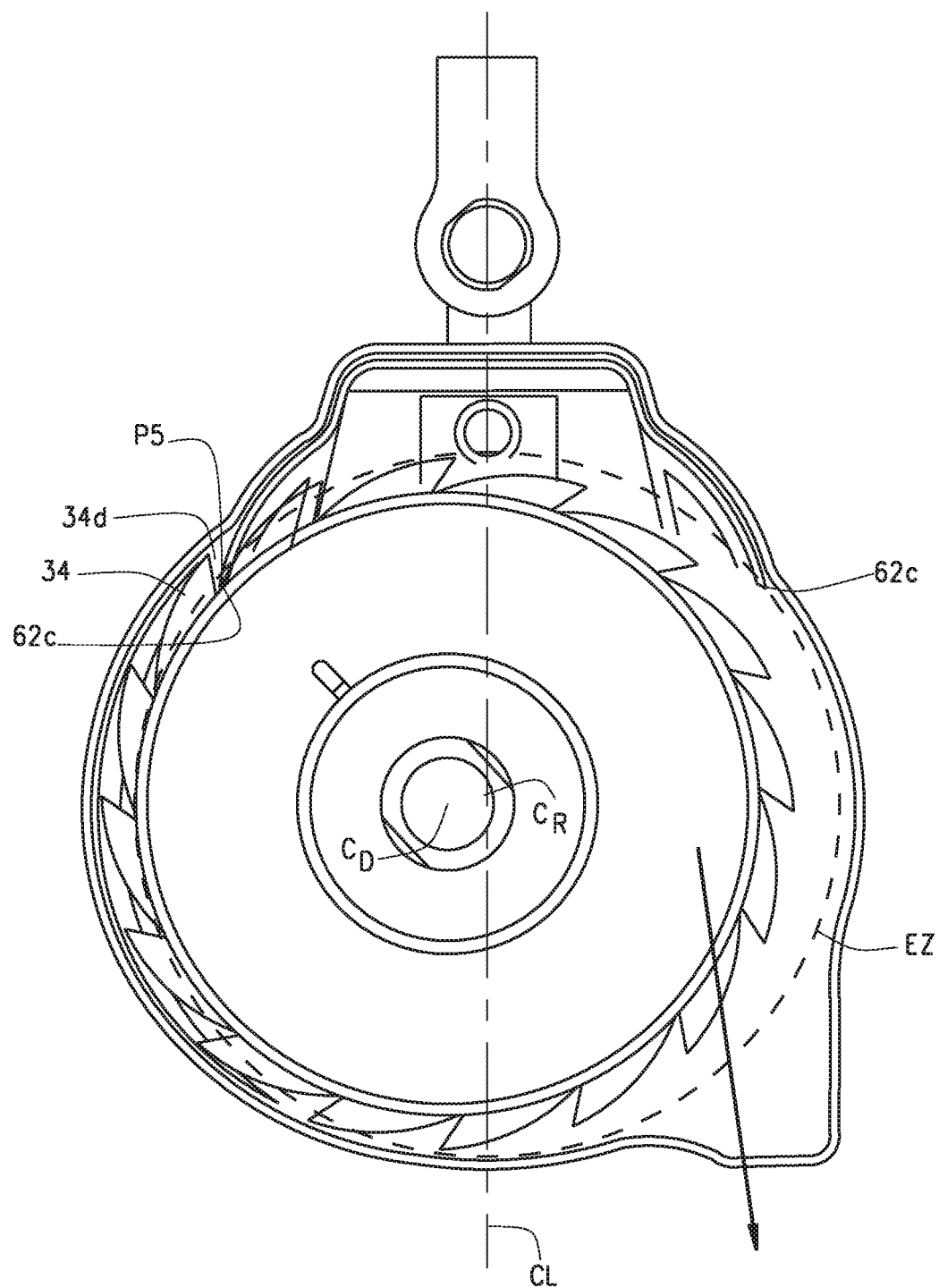
Figure 10B:
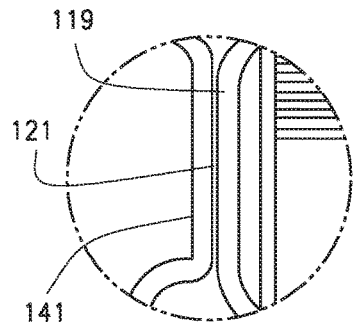
FIG. 10B is an enlarged fragmentary view taken along circle B of FIG. 10A.
Figure 10A:
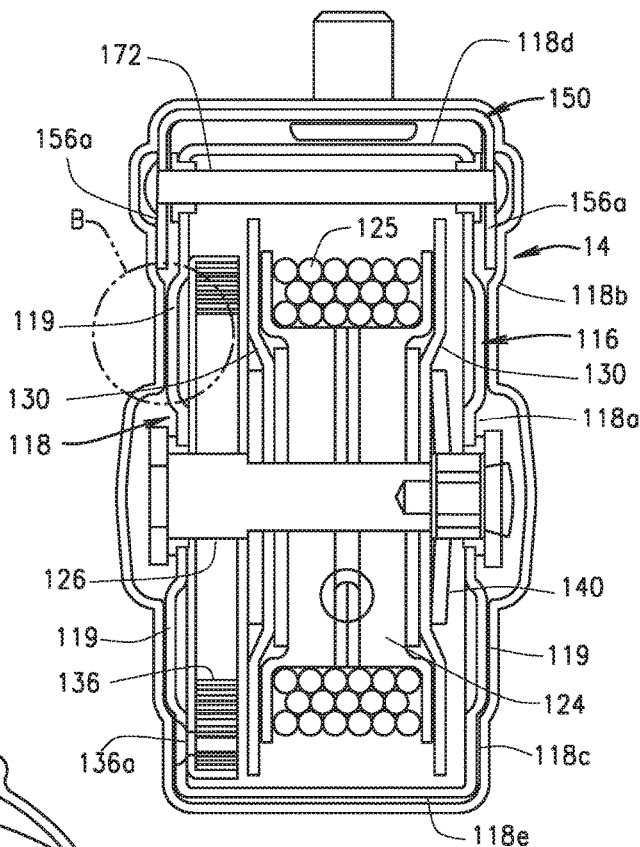
FIG. 10A is a cross-sectional view of an alternative embodiment of the retractable with the housing omitted for purposes of clarity.

The inner frame 16 is pivotally mounted to a stop member 50 by means of an upper shaft 52 which extends through the upper portion 18b2 of the neck 18b of the upper frame. As discussed below, the stop member is positionally fixed within the retractable housing. The stop member 50 is shown to be a stop cap, which overlaps or covers only a portion of the sperrads. The inner frame 16 includes aligned openings 18d in the upper portions 18b2 of the inner frame neck 18 and aligned openings 20b in the walls which define the sunken middle portion 20a of the inner frame top portion 20. The stop cap 50 has a central stop cap body 56 defined by side walls 56a, end walls 56b, and a top 56c. The side walls 56a include aligned openings 58 through which the top shaft 52 extends. Thus, as can be appreciated, the inner frame 16 (with the drum assembly and sperrad) can pivot about the top shaft 52 relative to the stop cap 50. As seen in FIGS. 7-9, the housing 14 has a side-to-side dimension sufficient to allow for the inner frame with the drum and spring to pivot about the top shaft 52 inside of the frame. A torsion spring 60 is received about the top shaft 52 in the sunken middle portion 20a of the inner frame top portion 20. The torsion spring 60 has opposed spiral portions 60a with ends 60b that are fixed to the inner frame and a central portion 60c between the spiral portions 60 that bears against the stop cap 50. Thus, the torsion spring 60 is operable to bias the inner frame 16 and the stop cap 50 to a normal or rest position relative to each other.

Figure 3:
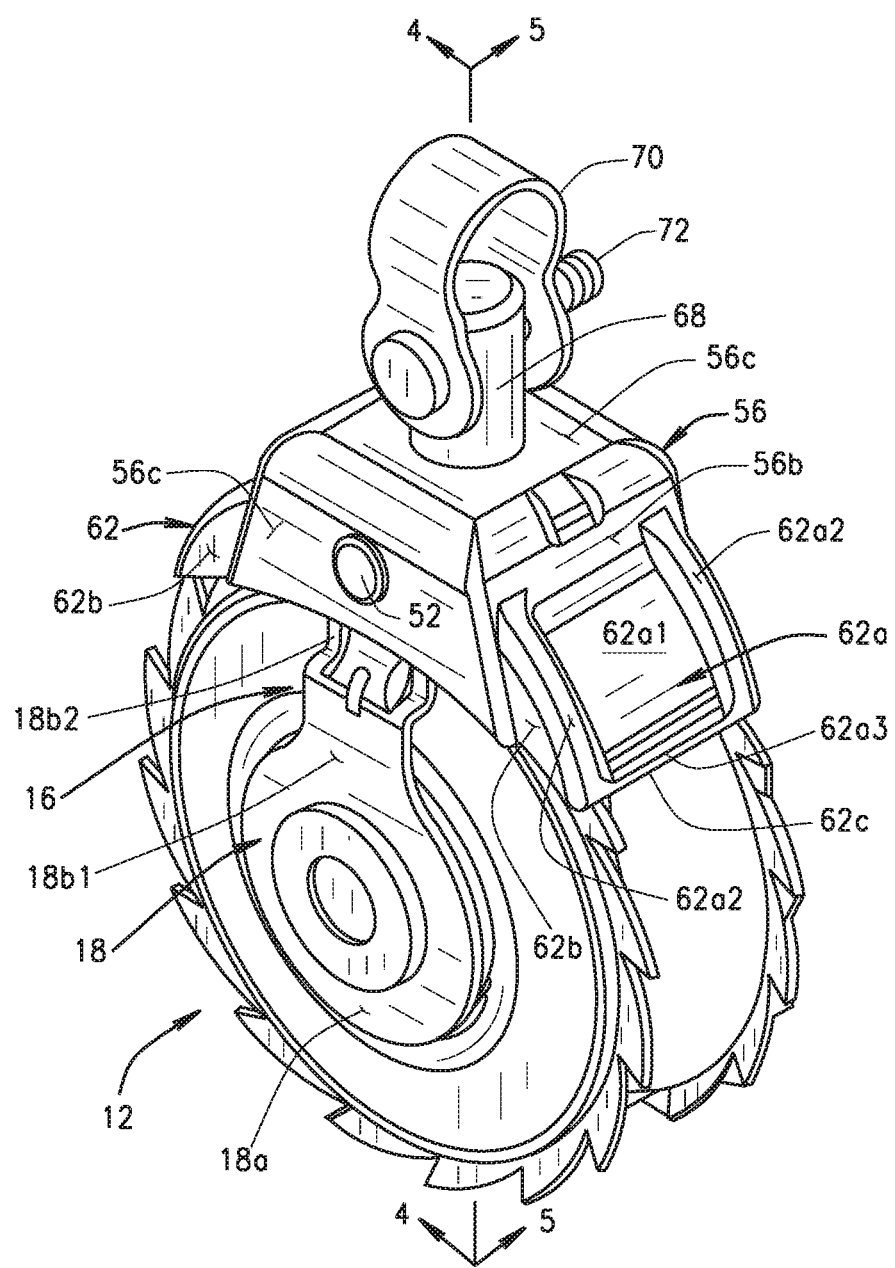
FIG. 3 is a perspective view of the retractable with the housing removed.

The stop cap 50 further includes a wing 62 extending from each of the end walls 56b. The wings 62, as best seen in FIG. 3, each comprise a curved surface 62a defined by a central portion 62a1 which is sunken relative to two side portions 62a2 and an end portion 62a3. The two side portions 62a2 and the end portion 62a3 define a frame around the periphery of the central portion 62a1. Side walls 62b extend from the side portions 62a2 to the end walls 56b of the stop cap main body 56. A lower edge 62c is formed at the edge of the end portion 62a3 and extends between the wing side walls 62b. The frame, defined by the side portions 62a2 and end portion 62a3, increases the strength of the wings 62, thereby allowing for the stop cap to be made of a lighter weight and thinner material. Provided the stop cap is of sufficient strength and thickness, the stop cap could also be made with a flat leading edge without the necessity of adding the frame. Further, the side portions 62a2 of the frame define a radius sized to receive the sperrad teeth 34. By having the enlarged radius area defined by the side portions 62a2 of the frame, the stop cap inner surface radius (i.e., the radius of the central portion 62a1) between the sperrad tips is lower than the sperrad tips. This helps prevent the webbing, lanyard, cable, etc. on the drum from being able to ride up over the sperrad tips during use of the retractable which could jam the sperrad and thereby prevent the retractable from working.

Lastly, the stop cap 50 has an opening 66 in its top surface 56c through which the shaft 68a of a swivel top 68 passes. The swivel top 68 further includes a bottom disc 68b which is positioned in the stop cap top main body between the top of the inner frame and the stop cap top surface 56c. A swivel yoke 70 is pivotally connected to the swivel top 68 by means of a pin 72 (such as a clevis pin). The stop cap 50 is thus fixed to the swivel top 68.

With reference to FIG. 8, the retractable has an engagement zone defined by an imaginary circle EZ which is aligned with the center $C_R$ of the retractable and concentric with the drum (aligned with the center $C_D$ of the drum) when the drum center is aligned with the vertical center line CL of the housing. The circle EZ has a radius which extends from the retractable center $C_R$ to the end of the stop cap wings 62. The circle EZ defines the inner perimeter of the engagement zone.

The stop cap 50, and more particularly, the wings 62 are sized and shaped such that as the drum and sperrad rotate relative to the stop cap 50 in the direction of the arrow R (FIG. 7), the lower or end edge 62c of the leading wing (on the right with respect to FIGS. 7-9) will ride on the teeth 34 of the sperrad 32 and such that the lower or end edge 62c of the trailing wing (on the left with respect to FIGS. 7-9). As noted below, the inner frame 16, and thus the axle 26, and the drum assembly 24 and sperrads 32 (all of which in combination define a pivot assembly), pivot relative to the stop cap 50 about a pivot axis defined by the shaft 52. Thus, the center $C_D$ of the axle (and therefore, the center of the drum and sperrads) moves in an arc across a vertical centerline CL of the retractable which extends through the shaft 52. The radius of this arc is thus the distance between the shaft 52 and the center $C_D$ of the drum-sperrad assembly. As noted above, the spring 60 biases the pivot assembly to the position shown in FIG. 7 to hold the sperrad tooth tip 34c against the inside surface 62a of the leading wing 62 (on the right side of the stop cap 50 with respect to FIG. 7). In this position, the center C of the axle is to the right of the vertical centerline CL of the retractable. As the sperrad and drum rotate in a direction indicated by the sperrad teeth 34 (i.e., by the direction of the arrow R (FIG. 7) which is in a clockwise direction with reference to FIGS. 7-9), the tips 34c of the teeth will push against the inner surface of the leading (right side) wing to cause the pivot assembly to pivot through the position shown in FIG. 8 to the position shown in FIG. 9 in which the center C of the axle is to the left of the vertical center line CL of the retractable. When the tip of a tooth clears the edge 62c of the leading wing, the spring 60 will force the pivot assembly in the opposite direction to return the pivot assembly to the position shown in FIG. 7 in which the center C of the axle is on the right side of the vertical centerline CL.

As can be appreciated, this back and forth pivoting of the pivot assembly causes the sperrads 32 to move back and forth relative to the stop cap and the engagement zone circle EZ between a locking position (FIG. 9) in which the sperrad teeth extend outside of the engagement zone circle EZ on the trailing wing side (left side with reference to FIGS. 7-9) of the circle EZ and an unlocked position (FIG. 7) in which the sperrad teeth extend outside the circle EZ on the leading wing side (right side with reference to FIGS. 7-9). Between the two extreme positions, the pivot assembly will move through the position shown in FIG. 8 (which is also an unlocked position) in which the sperrad teeth are all within the circle EZ. As seen in FIG. 9, in the locked position, the lower or end edge 62c of the trailing wing is engaged in the gap 34d defined by the leading edge of a tooth 34, thereby interfering with (and preventing) further rotation of the sperrads and the drum. During normal operation of the retractable (i.e., rotation of the drum and sperrad at less than a predetermined rotational locking speed), the spring 60 will pivot the pivot assembly out of the engagement zone, and thus out of the locking position, before the edge 62c of the trailing wing can be engaged by the sperrad tooth tip 34c. However, during a fall, rotation of the drum, and thus of the sperrad, in the direction indicate by the arrow R, increases beyond the predetermined locking rotational speed, and the spring 60 will not be able to move sperrad back within the diameter of the engagement zone circle EZ before the next tooth 34 approaches the edge of the trailing wing, and the edge 62c of the trailing wing therefore will be engaged by the sperrad tooth gap to prevent further rotation of the drum. Thus further resistance to unwinding of the webbing from the drum will stop the fall. That is, the clutch will allow about 3½ feet (about 1 meter) of web or lanyard to be extracted from the retractable after lockup to reduce impact forces on the body of the wearer to an arrest force of under 900 lbs. (under 4 kN).

As can be appreciated, the locking speed which must be exceeded to prevent the spring from pivoting the sperrad to an unlocked position will depend on the force created by the accelerating mass of the pivoting drum (i.e., the falling of the wearer) and the strength of the spring 60 which is trying to move the drum back to the unlocked position. When the locking speed will be exceeded with the force of the falling worker exceeds the spring strength.

As can be seen, unlike conventional retractables, the retractable 10 omits traditional pawls. The locking method to stop rotation is based on the rotational mechanical relationship between the stop cap 50 and the pivot assembly (which includes the drum assembly 24 and the sperrads 32). In essence, the stop cap 50 operates as a fixed pawl for locking purposes and the drum/sperrad pivots relative to the stop cap. This is accomplished by supporting the drum assembly 24 and sperrads on the inner frame 16, and pivotally connecting the inner frame 16 to the stop cap 50. With reference to the orientations shown in FIGS. 7-9, the torsional spring 60 presses the drum assembly 24 to hold the sperrad teeth 34 against the inside of surface 62a of the wing 62 on the right side of the stop cap 50 at position P1, as seen in FIG. 7. The drum, as noted above, is rotationally fixed to the sperrad using compressed Bellville washers. As the sperrad teeth 34 rub against the inside of the stop cap wing surface 62a during rotation of the drum and sperrad, the drum oscillates back and forth inside the stop cap. Rotation of the sperrad clockwise to the position P2 shown in FIG. 8 causes the inner frame 16, and hence the drum-sperrad assembly, to pivot about the top shaft 52. Notice that at the point of maximum pivotal rotation (FIG. 8), the tip of the sperrad at position P2 has caused the tip of the sperrad at location P3 to move into the circle EZ of the engagement zone, the annular width of which is defined by the tips of the teeth 34. As seen in FIG. 8, this pivoting of the inner frame and the drum-sperrad assembly relative to the stop cap has caused the sperrad teeth on the left side of the sperrad (with respect to FIG. 8) to extend outside of the engagement zone circle EZ, as seen at location P4. With the sperrad teeth extending outside of the engagement zone circle, the unit will lock up (i.e., cease to rotate) in the event of a failure of the drum assembly 24 to pivot about the top shaft 52. This is so, because the leading edge 34b of the next tooth 34 of the sperrad will engage the lower edge of the stop cap wing, and the stop cap wing will prevent further or continued rotation of the drum-sperrad assembly about the axle 26. Note that in this embodiment, the retraction spring 36 of the drum assembly 24 is always working against the torsional spring 60 in the stop cap 50. The spring force keeps the sperrad tooth tip always rubbing against the inside of the right (leading) wing (with reference to FIGS. 7-9) of the stop cap between locations P1 and P2 until a sudden pull (as in the case of a fall) on the webbing W causes the sperrad tips and drum assembly to move away from the stop cap at location P2 and engage the stop cap at location P5, as seen in FIG. 9. This sudden pull on the web W increases the rotational speed of the sperrad and forces the sperrad into total engagement with the stop cap at location P5 (FIG. 9). Notice that in this embodiment, the force due to the tension on the webbing drives the gap 34d between the sperrad teeth directly into engagement with the stop cap and does not require a pawl to leave the cam surface by centrifugal motion to create engagement as in currently available cam driven pawl designs. In normal use, the rotational rate of the drum and sperrad and its action against the inside of the stop cap is insufficient to overcome the return force of the torsion spring 60, which would otherwise cause a total engagement of the sperrad with the stop cap (and thus lock up the retractable).

In addition, the design configuration of the retractable 10 will prevent rotation of the drum when mechanical issues cause the drum and sperrad to become inoperable (i.e., prevent pivoting of the drum and sperrad). This can occur, for example, if the inner frame is frozen in position relative to the stop cap, such as by ice, or if debris blocks the inner frame from pivoting relative to the stop cap. Normal locking cannot occur until the normal pivoting action of the tooth tip rubbing the inside of the trailing edge of the stop cap caused the tooth tip approaching the leading edge of the stop cap to actually rise above (or shift outside of) the circle EZ. Whenever the tooth tip extends beyond the engagement zone circle EZ on the trailing wing side of the engagement zone, the tooth tip moves into the true engagement zone. Therefore, anything (such as, contaminates, a broken spring, ice, mechanical damage, etc.) that prevents the drum/sperrad from pivoting from the locking position (FIG. 9) to move to be within the circle EZ locks the retractable. Hence, webbing will not be able to be extracted from the retractable if there is mechanical damage to the retractable. This is because the tip of the tooth approaching the leading edge of the stop cap is already outside the engagement zone circle EZ due to the fact that it is already pushed to that position by the cam surface (trailing edge 34a) of the tooth rubbing on the trailing stop cap inner surface. If a worker pulls on the web and the webbing will not come out of the retractable, it means there is a malfunction of the working elements and this prevents the worker from being able to use a damaged or non-functioning unit.

As can be seen from the foregoing, the retractable 10 does not include pawls, as do currently available retractables, to stop rotation of the drum in case of a fall. Rather, as noted above, the stop cap 50 engages the sperrad teeth to stop the rotation of the drum in a fall. The elimination of the smallest working element (the pawls) from current retractables and transferring their function to the largest working element (the drum) eliminates the inability to further reduce the size and weight of retractables. Thus, for example, personal retractables which are normally limited by pawl strength requirements to diameters of about 3.5″ or larger can now be reduced even further with the only limiting factor being the desired length of the specified webbing.

An alternative embodiment of the retractable is shown in FIGS. 10A-13. The retractable 110 is generally similar to the retractable 10. The retractable 110 comprises a housing which contains the components the retractable. As with the retractable 10, the retractable 110 includes an inner frame 116 supporting an axle 126 on which a drum 124 is mounted, such that the drum can rotate within the housing relative to the inner frame 116. As is known, a cable or lanyard 125 is wound on the drum 124. Opposed sperrads 130 are mounted to the shaft on opposite sides of the drum 124. A spiral power spring 136 is mounted on the axle 126 on one side of the drum adjacent one of the sperrads 132. A Belleville spring washer 140 is mounted on the axle 126 on the opposite side of the drum 124. The Belleville washer 140 ensures a friction fit, such that the drum 124 will be frictionally fixed rotationally relative to the sperrads 132 by, such that the drum and sperrads will rotate together and in unison. The retractable 110 differs from the retractable 10 in part in that the retractable 110 includes only one Belleville washer 140 and only one power spring 136.

Figure 11:
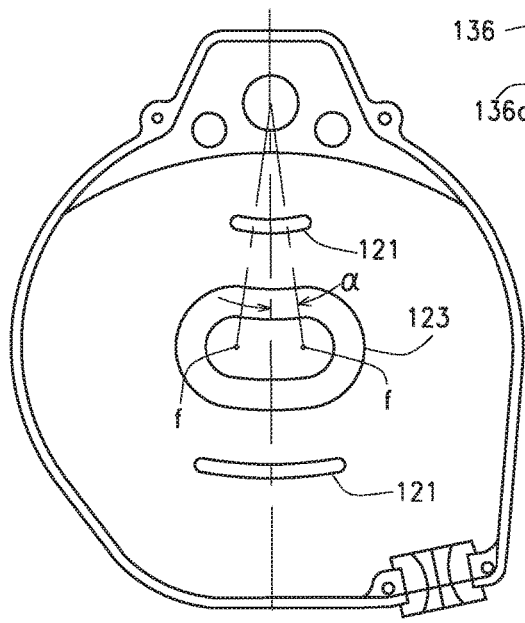
FIG. 11 is a side elevational view of one half of the retractable housing.

The retractable 110 also differs from the retractable 10 in the configuration of the inner frame 116. As seen in FIGS. 12 and 13, the inner frame 116 comprises opposed side members 118, each of which has a generally circular mid-section 118a (to which the shaft 126 is mounted), a neck 118b extending upwardly from the mid-section 118a, and a leg 118c extending downwardly from the mid-section 118a. The side members 118 include portions 119 in both the neck 118b and the leg 118c of the side members which are stepped out of the plane of the side member portions 118a and 118c. A top member 118d extends between the ends of the neck 118b, and a bottom member 118e extends between the ends of the legs 118c. Thus, the inner frame 116 surrounds the drum, sperrads, power spring, and Belleville washer. The housing for the power spring, and thus, the power spring 136, is fixed to the inner frame 116 by means of a fastener 136a which extends through the frame leg 118c into the power spring housing. The projecting portions 119 of the inner frame provided a narrower wear surface to rub on plastic ribs 121 (FIGS. 10B and 11) on an inner surface of the housing. This reduces contact friction between the housing (which can be made of plastic) and the pivoting inner frame 116 in case the plastic housing touches the frame. As seen in FIG. 11, the housing includes an elongate generally oval receiving area 123 which receives the enlarged ends of the shaft 126. The ribs 121 include an upper rib above the receiving area 123 and a lower rib below the oval area. The ribs 121 and the receiving area 123 are all slightly arced, to accommodate the pivotal motion of the pivot assembly (including the inner frame, the shaft, the drum, and the sperrads). The elongate oval receiving area 123 can define an angle α from its center line to an inner edge of about 5° to about 10°, and preferably about 8°, from the foci f or centers of the circles defining the ends of the oval receiving area.

The retractable 110 includes a stop cap 150 which is fixed in place in the housing 114, as seen in FIGS. 12 and 13. The stop cap 150, like the stop cap 50, comprises a body having side walls 156a, end walls 156b and a top 156c. Leading and trailing wings 162 extend from the ends of the end walls 156b. The inner frame 116 is pivotally mounted to the stop cap 150 by pin 172 which extends between the upper ends of the inner frame arms 118b and the opposite side walls 156a of the stop cap 150.

The retractable defines an engagement zone, the inner edge of which is defined by a circle EZ which is centered on the center $C_R$ of the retractable and has a radius which extends from the retractable center $C_R$ to the end of the stop cap wings 162. When the axis of the inner frame 116 is aligned with the center line $C_L$ of the retractable, the center of the drum $C_D$ is aligned with the center $C_R$ of the retractable.

The operation of the retractable 110 is identical to the operation of the retractable 10. A biasing spring (similar to the spring 60) biases the inner frame 116 to the position shown in FIG. 13 in which two of the teeth 134 of the sperrads 132 (at positions T1 and T2) are urged against the inner surface of the leading wing 162a, and in which the drum center $C_D$ is to the right of the retractable center $C_R$ (with reference to FIG. 12). In this position, the sperrad tooth at position T3 below the trailing wing 162b is inside of the engagement zone circle EZ. As the drum 124 and sperrads 132 rotate clockwise (with reference to FIG. 13), the interaction of the sperrad teeth 134 with the inner surface of the leading wing 162a as the teeth move from position T1 to T2 causes the frame 116 to pivot to the left (with reference to FIGS. 12 and 13) such that the sperrad teeth 134 extend through the engagement zone circle EZ and enter the engagement zone, as seen in FIG. 12, at position T4. In this position, if the drum is rotating sufficiently fast (such as during a fall), or if the drum is unable to pivot so that the tooth at position T3 can move underneath the stop cap (i.e., within the engagement zone circle EZ), the edge of the trailing wing 162b will engage the teeth, as seen in FIG. 14, to force the sperrad/drum sub-assembly into full engagement with the stop cap such that the edge of the stop cap engages or is received in the pocket 134e of a tooth 134 in order to prevent rotation of the sperrads and the drum. In normal operation, the sperrad/drum sub-assembly will pivot about the pin 172 relative to the stop cap 150 between the positions shown in FIGS. 12 and 13 due to the force of the biasing spring and the engagement of the sperrad teeth with the stop cap leading wing 162a. Thus, the sperrad teeth will not engage the edge of the trailing wing 162b, and the drum will be able to rotate in an unwinding direction.

As various changes could be made in the above constructions without departing from the scope of the invention, it is intended that all matter contained in the above description or shown in the accompanying drawings shall be interpreted as illustrative and not in a limiting sense. For example, the assembly could comprise a fixed rigid outer frame rather than a stop cap that provides the stopping surface (i.e., the lower or end edge of the stop cap). Such an outer frame could go all the way around the inner pivoting frame. These examples are illustrative only.

The invention claimed is:

1. A retractable assembly comprising:
an inner frame; said inner frame comprising opposed side members and a top member extending between upper ends of the side members;
a drum assembly and a sperrad mounted to said inner frame between said side members to rotate about an axis relative to said inner frame; said drum assembly and said sperrad being rotationally fixed relative to each other; said sperrad having a sperrad body and a plurality of teeth extending from a periphery of said sperrad body; and
a stop member to which said inner frame is pivotally mounted such that said inner frame, and hence said drum assembly and said sperrad, can pivot relative to the stop member; said stop member comprising a central body, a leading portion extending from a first side of said central body and a trailing portion extending from a second side of said central body opposite said first side;
said retractable assembly defining a generally circular engagement zone having an inner circumference defined by a circle having a center $C_R$ which is concentric with the drum assembly when a center $C_D$ of the drum assembly is aligned with a vertical center line CL of the retractable assembly, and wherein the inner circumference of the engagement zone has a radius which extends from the center $C_R$ to an end of the end edges of said leading and trailing portions of said stop member;

whereby, said inner frame, with said drum assembly and said sperrad, can pivot relative to said stop member between an unlocked position in which said sperrad teeth are inside of the engagement zone beneath the trailing portion of said stop member and a locked position in which the sperrad teeth extend outside of the engagement zone beneath said trailing portion of said stop member.

2. The retractable assembly of claim 1 wherein said drum assembly and said sperrad are independent elements of said retractable assembly.

3. The retractable assembly of claim 1 wherein said stop member comprises a stop cap; said stop cap covering only a portion of said sperrad.

4. The retractable assembly of claim 1 comprising a spring which engages said inner frame and said stop member to bias said inner frame, and hence said drum assembly and said sperrad, to said unlocked position.

5. The retractable assembly of claim 4 wherein said sperrad teeth are sized such that when in said unlocked position, said sperrad teeth engage a surface of the leading portion of the stop member, and as said sperrad rotates in an unwinding direction, said sperrad teeth push against said surface of said leading portion of said stop member to pivot said sperrad to said locked position.

6. The retractable assembly of claim 2 wherein said sperrad comprises a first sperrad associated with a first wall of said drum assembly and a second sperrad associated with a second wall of said drum assembly.

7. The retractable assembly of claim 6 wherein said leading portion and trailing portion of said stop member each have an outer wall and side walls defining a space which receives the first and second sperrads, said leading portion and trailing portion each have a lower edge which extends between the side walls and across the sperrads.

8. The retractable assembly of claim 7 wherein said leading and trailing portions of said stop member each comprise a sunken central portion; said sunken central portion defining a diameter smaller than a diameter of said sperrad.

9. The retractable assembly of claim 1 further comprising an axle extending between said side members of said inner frame; said drum assembly and sperrad being mounted on said axle.

10. The retractable assembly of claim 1 comprising a housing which surrounds and encloses said inner frame, drum assembly, and sperrad; said housing having an inner surface facing said inner frame and comprising a rib on said inner surface against which said inner frame slides during use of the retractable assembly.

11. The retractable assembly of claim 10 wherein said side member of said inner frame includes projecting portions which engage said rib.

12. The retractable assembly of claim 1 wherein said side members of said inner frame have a bottom edge spaced below said sperrad; said inner frame further including a bottom member extending between said side members.

* * * * *